(12) United States Patent
Erra et al.

(10) Patent No.: US 12,074,858 B2
(45) Date of Patent: Aug. 27, 2024

(54) METHOD AND SYSTEM FOR CAPTURING DATA FROM AN EXTERNAL CLOUD COMPUTING PLATFORM

(71) Applicant: JPMorgan Chase Bank, N.A., New York, NY (US)

(72) Inventors: Sai Rahul Erra, Hyderabad (IN);
Jagadeesh Koganti, Hyderabad (IN);
Bodhisatta Sarkar, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 344 days.

(21) Appl. No.: 17/447,855

(22) Filed: Sep. 16, 2021

(65) Prior Publication Data
US 2022/0109665 A1  Apr. 7, 2022

Related U.S. Application Data

(60) Provisional application No. 63/115,970, filed on Nov. 19, 2020.

(30) Foreign Application Priority Data

Oct. 7, 2020  (IN) .............................. 202011043582

(51) Int. Cl.
*G06F 16/958* (2019.01)
*G06F 9/54* (2006.01)
*H04L 9/40* (2022.01)

(52) U.S. Cl.
CPC .............. *H04L 63/08* (2013.01); *G06F 9/547* (2013.01); *G06F 16/958* (2019.01)

(58) Field of Classification Search
USPC ............................................. 726/6
See application file for complete search history.

(56) References Cited

U.S. PATENT DOCUMENTS

| | | | |
|---|---|---|---|
| 10,938,924 B1* | 3/2021 | Jensen | H04L 67/10 |
| 2011/0173037 A1* | 7/2011 | Attenberg | G06Q 10/063 |
| | | | 705/7.11 |
| 2014/0068696 A1* | 3/2014 | Schaad | H04L 63/10 |
| | | | 726/1 |
| 2019/0132931 A1* | 5/2019 | Sharma | H04L 63/0876 |
| 2019/0155597 A1* | 5/2019 | Lander | G06F 11/3688 |
| 2019/0372960 A1* | 12/2019 | Huang | H04L 63/061 |
| 2020/0133955 A1* | 4/2020 | Padmanabhan | G06Q 30/01 |
| 2020/0234154 A1* | 7/2020 | Ares | G06F 16/217 |
| 2021/0133196 A1* | 5/2021 | Gladwin | G06F 21/6227 |
| 2022/0092621 A1* | 3/2022 | Abdallah | G06F 16/9532 |

* cited by examiner

*Primary Examiner* — Sakinah White Taylor
(74) *Attorney, Agent, or Firm* — Greenblum & Bernstein, P.L.C.

(57) ABSTRACT

A method for capturing data from an external cloud computing platform is provided. The method includes capturing data from an application maintained in the external cloud computing platform; identifying a data set from the data based on a predetermined criterion, the data set including a log usage form corresponding to a user; extracting the identified data set from the data; authenticating a connection between the external cloud computing platform and an internal cloud computing platform; publishing, via a network interface, the extracted data set to the internal cloud computing platform by using the authenticated connection; and storing the published data set in a database on the internal cloud computing platform.

20 Claims, 7 Drawing Sheets

METHOD AND SYSTEM FOR CAPTURING DATA FROM AN EXTERNAL CLOUD COMPUTING PLATFORM

CROSS-REFERENCE TO RELATED APPLICATIONS

This application claims the benefit of U.S. Provisional Patent Application Ser. No. 63/115,970, filed Nov. 19, 2020, and claims the benefit of Indian Provisional Patent Application No. 202011043582, filed Oct. 7, 2020. The disclosure of each of these applications is hereby incorporated by reference in its entirety.

BACKGROUND

1. Field of the Disclosure

This technology generally relates to methods and systems for capturing data, and more particularly to methods and systems for automatically capturing application data from an external cloud computing platform and redirecting the captured data to an internal cloud computing platform for storage.

2. Background Information

Many business entities provide services and experiences to customers by using applications that are built on content management platforms. The applications traditionally process and store data in third-party external cloud computing platforms that correspond to the content management platform. Historically, storage of data in third-party external cloud computing platforms have resulted in operational challenges with respect to security and performance considerations.

One drawback of conventionally maintaining data in the third-party external cloud computing platforms is that in many instances, the third-party external cloud computing platforms provide data maintenance services for many business entities at any given time. As a result, sensitive user data for a specific business entity are stored together with other data from various other business entities in what is essentially a public cloud computing platform. In addition, control over deployment of the data and access to the data may be limited for any given business entity due to the external nature of the third-party cloud computing platforms. Similarly, data manipulation capabilities such as, for example, user acceptance testing (UAT) and access to production environments may also be limited.

Therefore, there is a need to capture application data automatically and seamlessly from the third-party external cloud computing platforms and redirecting the captured data to an internal cloud computing platform of a particular business entity.

SUMMARY

The present disclosure, through one or more of its various aspects, embodiments, and/or specific features or sub-components, provides, inter alia, various systems, servers, devices, methods, media, programs, and platforms for automatically capturing application data from an external cloud computing platform and redirecting the captured data to an internal cloud computing platform for storage.

According to an aspect of the present disclosure, a method for capturing data from an external cloud computing platform is provided. The method may be implemented by at least one processor. The method may include capturing data from at least one application; identifying at least one data set from the data based on at least one predetermined criterion, the at least one data set may include a log usage form corresponding to a user; extracting the identified at least one data set from the data; authenticating a connection between the external cloud computing platform and an internal cloud computing platform; publishing, via a network interface, the extracted at least one data set to the internal cloud computing platform by using the authenticated connection; and storing the published at least one data set in a database on the internal cloud computing platform.

In accordance with an exemplary embodiment, the at least one application may include an external application that is maintained in the external cloud computing platform and generated by using a content management platform.

In accordance with an exemplary embodiment, the at least one application may include at least one from among a monolithic application and a microservice application.

In accordance with an exemplary embodiment, the log usage form may include at least one from among download information corresponding to an amount of users who have downloaded a digital asset from the external cloud computing platform, and administrative information corresponding to the user and the at least one application.

In accordance with an exemplary embodiment, the connection may be authenticated by using a protocol that may include a lightweight directory access protocol.

In accordance with an exemplary embodiment, the connection may be tagged based on a result of the authentication, the tag may include an indication that the connection is from a trusted source and preauthorized permission to bypass additional authentication.

In accordance with an exemplary embodiment, the preauthorized permission may include at least one reauthentication requirement, the at least one reauthentication requirement may include a predetermined period of time after which reauthentication of the connection is required.

In accordance with an exemplary embodiment, the connection may include at least one web service relating to a representational state transfer, the representational state transfer may include an architectural style usable to implement an application programing interface.

In accordance with an exemplary embodiment, the capturing of the data from the at least one application may include removing the data from a corresponding data flow and preventing storage of the data in the external cloud computing platform.

In accordance with an exemplary embodiment, the capturing of the data from the at least one application may include copying the data from a corresponding data flow and permitting storage of the data in the external cloud computing platform.

According to an aspect of the present disclosure, a computing device configured to implement an execution of a method for capturing data from an external cloud computing platform is disclosed. The computing device comprising a processor; a memory; and a communication interface coupled to each of the processor and the memory, wherein the processor may be configured to capture data from at least one application; identify at least one data set from the data based on at least one predetermined criterion, the at least one data set may include a log usage form corresponding to a user; extract the identified at least one data set from the data; authenticate a connection between the external cloud computing platform and an internal cloud computing platform;

publish, via a network interface, the extracted at least one data set to the internal cloud computing platform by using the authenticated connection; and store the published at least one data set in a database on the internal cloud computing platform.

In accordance with an exemplary embodiment, the at least one application may include an external application that is maintained in the external cloud computing platform and generated by using a content management platform.

In accordance with an exemplary embodiment, the at least one application may include at least one from among a monolithic application and a microservice application.

In accordance with an exemplary embodiment, the log usage form may include at least one from among download information corresponding to an amount of users who have downloaded a digital asset from the external cloud computing platform, and administrative information corresponding to the user and the at least one application.

In accordance with an exemplary embodiment, the processor may be further configured to authenticate the connection by using a protocol that includes a lightweight directory access protocol.

In accordance with an exemplary embodiment, the processor may be further configured to tag the connection based on a result of the authentication, the tag may include an indication that the connection is from a trusted source and preauthorized permission to bypass additional authentication.

In accordance with an exemplary embodiment, the preauthorized permission may include at least one reauthentication requirement, the at least one reauthentication requirement may include a predetermined period of time after which reauthentication of the connection is required.

In accordance with an exemplary embodiment, the connection may include at least one web service relating to a representational state transfer, the representational state transfer may include an architectural style usable to implement an application programing interface.

In accordance with an exemplary embodiment, the capturing of the data from the at least one application may include removing the data from a corresponding data flow and preventing storage of the data in the external cloud computing platform.

In accordance with an exemplary embodiment, the capturing of the data from the at least one application may include copying the data from a corresponding data flow and permitting storage of the data in the external cloud computing platform.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
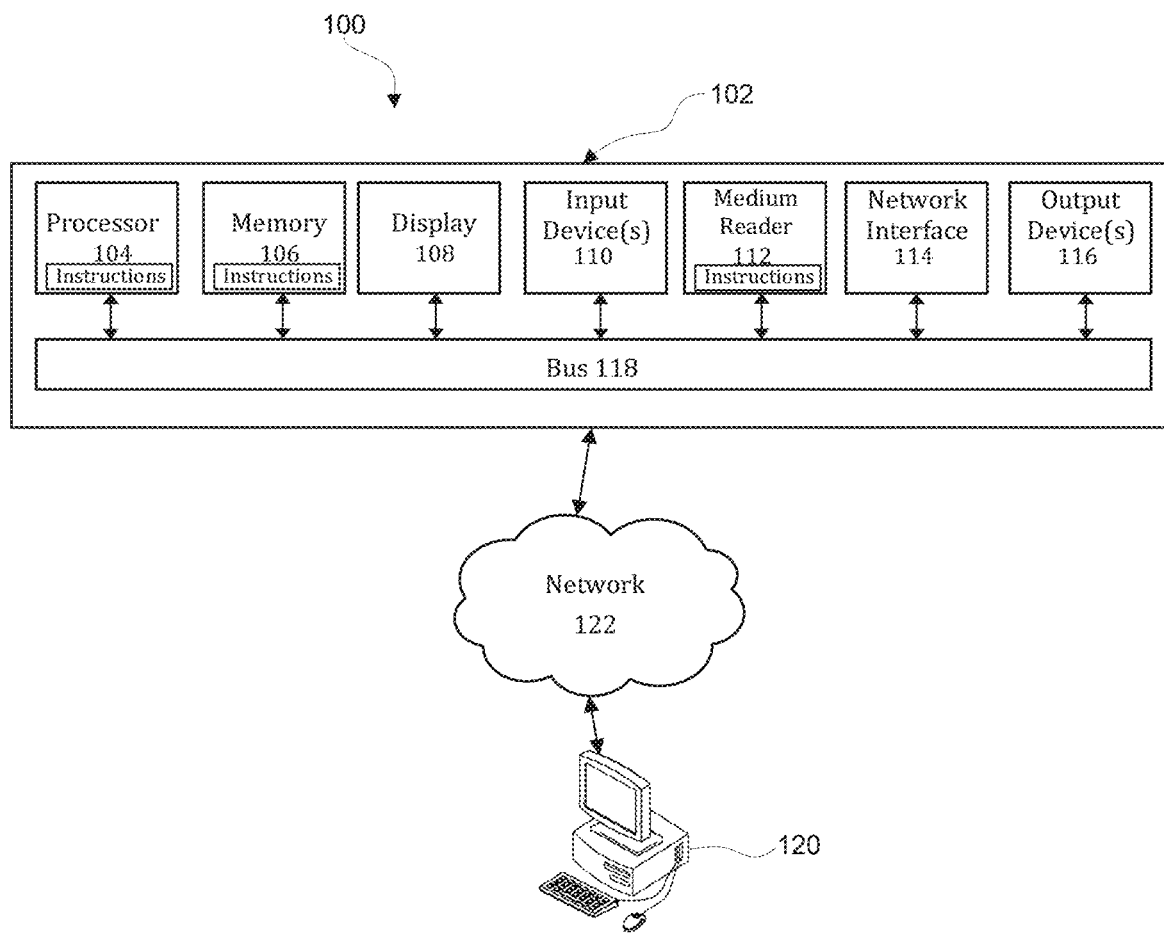
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically capturing application data from an external cloud computing platform and redirecting the captured data to an internal cloud computing platform for storage.

Figure 2:
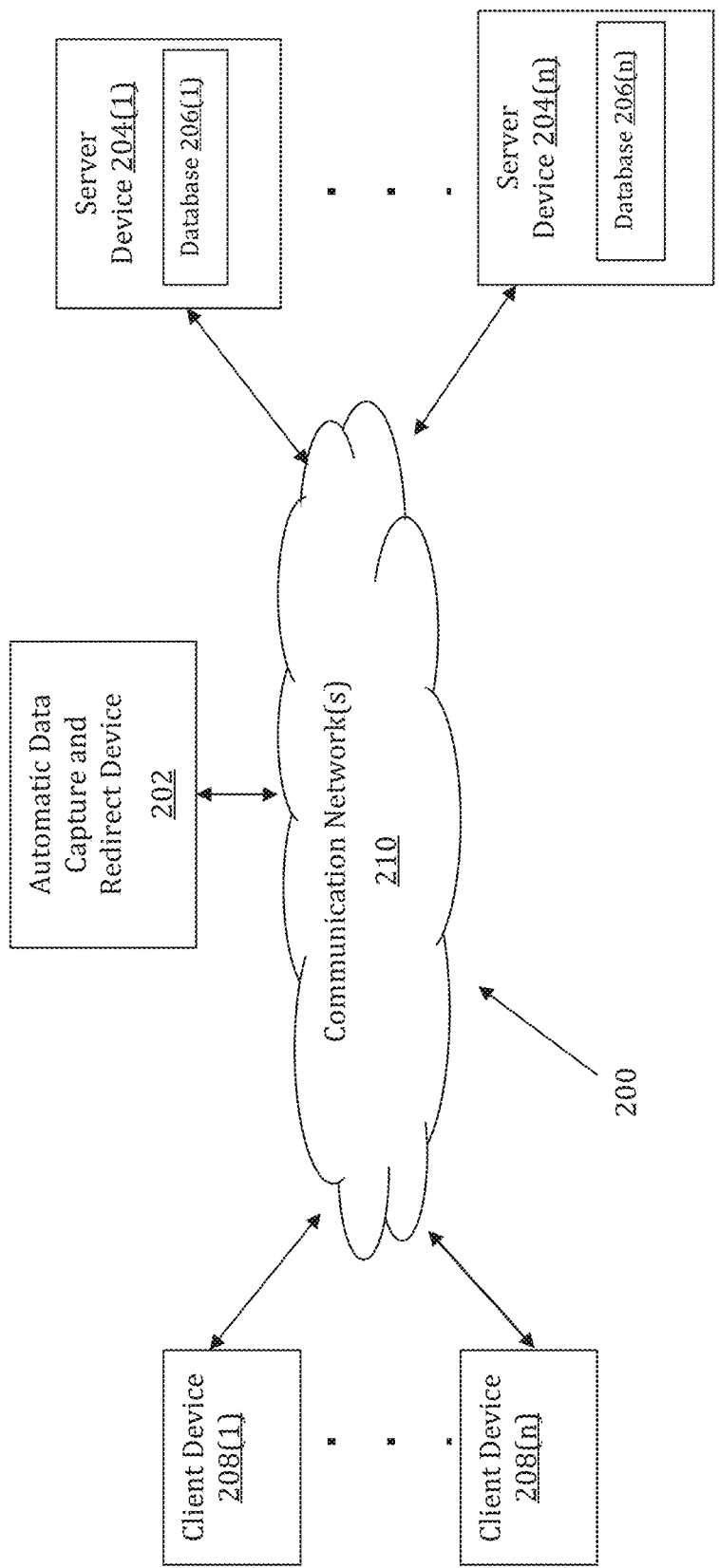
FIG. 2 illustrates an exemplary diagram of a network environment.

Referring to FIG. 2, a schematic of an exemplary network environment 200 for implementing a method for automatically capturing application data from an external cloud computing platform and redirecting the captured data to an internal cloud computing platform for storage is illustrated. In an exemplary embodiment, the method is executable on any networked computer platform, such as, for example, a personal computer (PC).

The method for automatically capturing application data from an external cloud computing platform and redirecting the captured data to an internal cloud computing platform for storage may be implemented by an Automatic Data Capture and Redirect (ADCR) device 202. The ADCR device 202 may be the same or similar to the computer system 102 as described with respect to FIG. 1. The ADCR device 202 may store one or more applications that can include executable instructions that, when executed by the ADCR device 202, cause the ADCR device 202 to perform actions, such as to transmit, receive, or otherwise process network messages, for example, and to perform other actions described and illustrated below with reference to the figures. The application(s) may be implemented as modules or components of other applications. Further, the application (s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ADCR device 202 itself, may be located in virtual server(s) running in a cloud-based computing environment rather than being tied to one or more specific physical network computing devices. Also, the application(s) may be running in one or more virtual machines (VMs) executing on the ADCR device 202. Additionally, in one or more embodiments of this technology, virtual machine(s) running on the ADCR device 202 may be managed or supervised by a hypervisor.

In the network environment 200 of FIG. 2, the ADCR device 202 is coupled to a plurality of server devices 204(1)-204(n) that hosts a plurality of databases 206(1)-206(n), and also to a plurality of client devices 208(1)-208(n) via communication network(s) 210. A communication interface of the ADCR device 202, such as the network interface 114 of the computer system 102 of FIG. 1, operatively couples and communicates between the ADCR device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ADCR device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ADCR devices that efficiently implement a method for automatically capturing application data from an external cloud computing platform and redirecting the captured data to an internal cloud computing platform for storage.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ADCR device 202 may be a standalone device or integrated with one or more other devices or apparatuses, such as one or more of the server devices 204(1)-204(n), for example. In one particular example, the ADCR device 202 may include or be hosted by one of the server devices 204(1)-204(n), and other arrangements are also possible. Moreover, one or more of the devices of the ADCR device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ADCR device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to application data, data sets, download information, administrative information, and log usage forms.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the ADCR device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the ADCR device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the ADCR device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ADCR device 202, the server devices 204(1)-204(n), or the client devices 208(1)-208(n), for example, may be configured to operate as virtual instances on the same physical machine. In other words, one or more of the ADCR device 202, the server devices 204(1)-204(n), or the client devices 208(1)-208(n) may operate on the same physical device rather than as separate devices communicating through communication network(s) 210. Additionally, there may be more or fewer ADCR devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
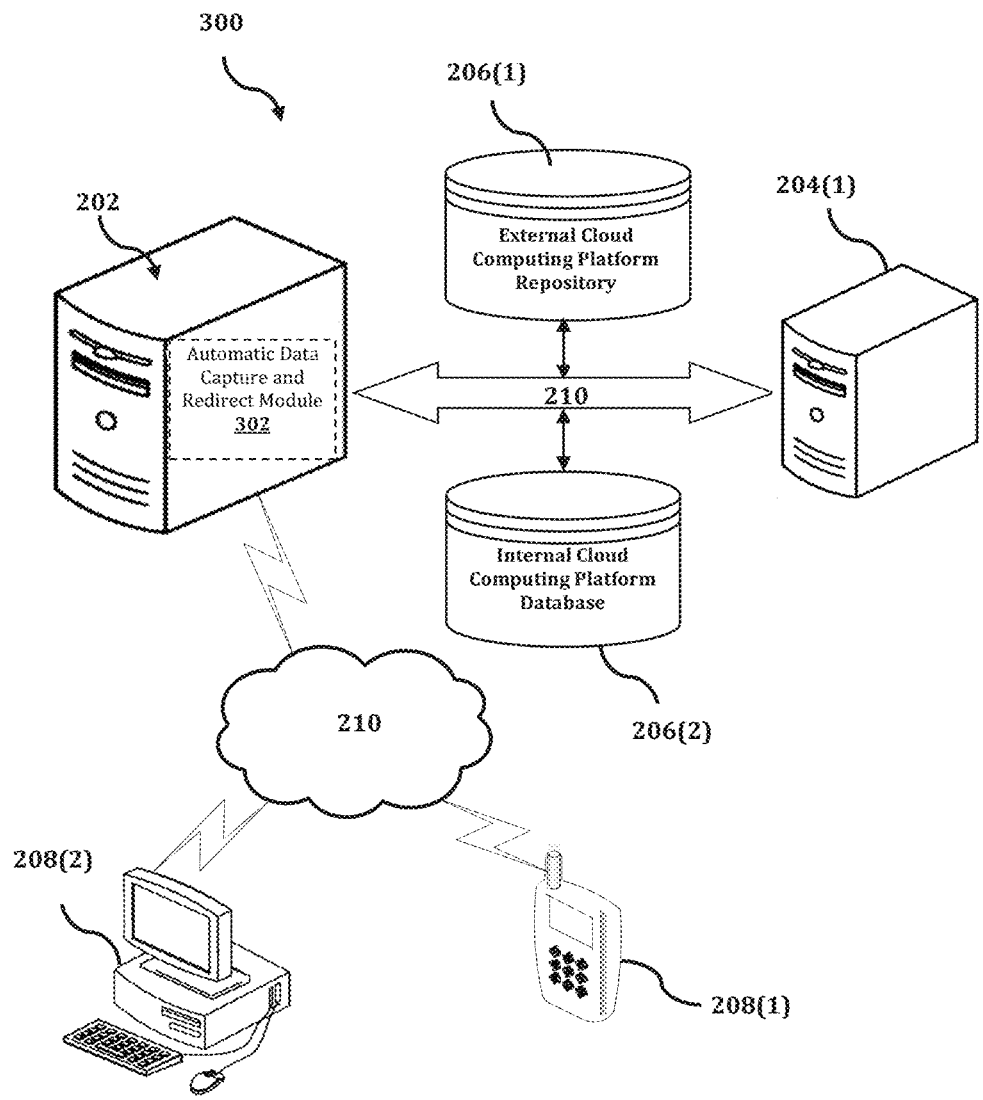
FIG. 3 shows an exemplary system for implementing a method for automatically capturing application data from an external cloud computing platform and redirecting the captured data to an internal cloud computing platform for storage.

The ADCR device 202 is described and shown in FIG. 3 as including an automatic data capture and redirect module 302, although it may include other rules, policies, modules, databases, or applications, for example. As will be described below, the automatic data capture and redirect module 302 is configured to implement a method for automatically capturing application data from an external cloud computing platform and redirecting the captured data to an internal cloud computing platform for storage.

An exemplary process 300 for implementing a mechanism for automatically capturing application data from an external cloud computing platform and redirecting the captured data to an internal cloud computing platform for storage by utilizing the network environment of FIG. 2 is shown as being executed in FIG. 3. Specifically, a first client device 208(1) and a second client device 208(2) are illustrated as being in communication with ADCR device 202. In this regard, the first client device 208(1) and the second client device 208(2) may be "clients" of the ADCR device 202 and are described herein as such. Nevertheless, it is to be known and understood that the first client device 208(1) and/or the second client device 208(2) need not necessarily be "clients" of the ADCR device 202, or any entity described in association therewith herein. Any additional or alternative relationship may exist between either or both of the first client device 208(1) and the second client device 208(2) and the ADCR device 202, or no relationship may exist.

Further, ADCR device 202 is illustrated as being able to access an external cloud computing platform repository 206(1) and an internal cloud computing platform database 206(2). The automatic data capture and redirect module 302 may be configured to access these databases for implementing a method for automatically capturing application data from an external cloud computing platform and redirecting the captured data to an internal cloud computing platform for storage.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ADCR device 202 via broadband or cellular communication. Of course, these embodiments are merely exemplary and are not limiting or exhaustive.

Upon being started, the automatic data capture and redirect module 302 executes a process for automatically capturing application data from an external cloud computing platform and redirecting the captured data to an internal cloud computing platform for storage. An exemplary process for automatically capturing application data from an external cloud computing platform and redirecting the captured data to an internal cloud computing platform for storage is generally indicated at flowchart 400 in FIG. 4.

Figure 4:
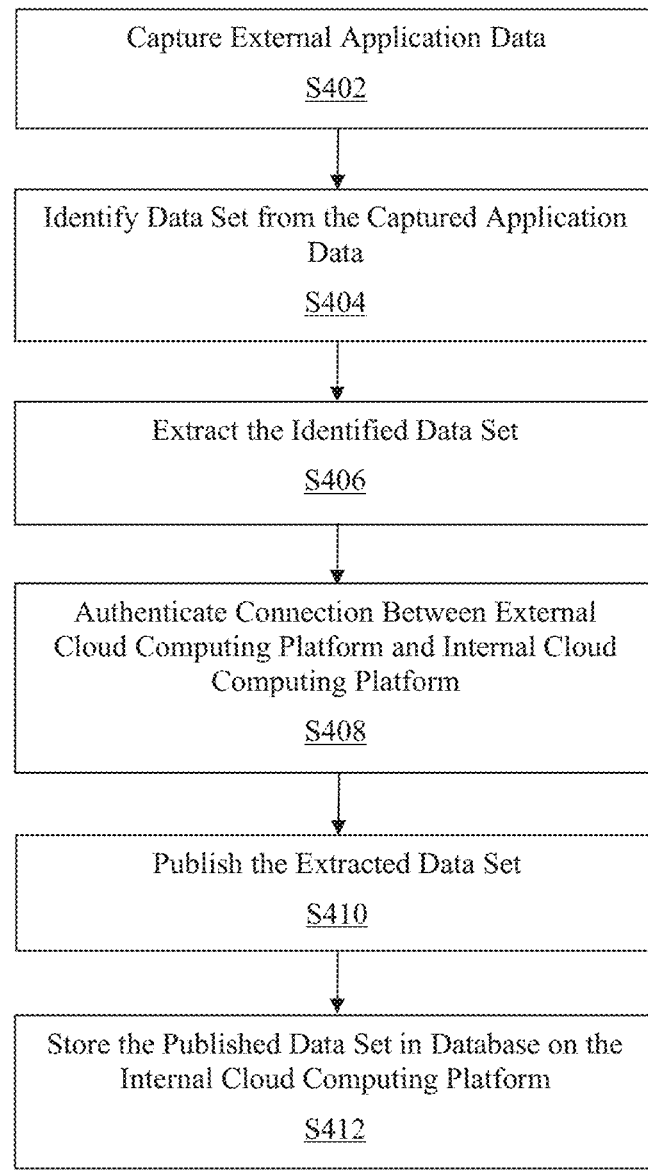
FIG. 4 is a flowchart of an exemplary process for implementing a method for automatically capturing application data from an external cloud computing platform and redirecting the captured data to an internal cloud computing platform for storage.

In the process 400 of FIG. 4, at step S402, data from an application may be captured. The data may include all application data generated by the application as a result of the application's operation. In an exemplary embodiment, a recording component may listen in on the outputs of the application to capture the data. The recording component may also be integrated into the application to directly capture the data from the application.

In another exemplary embodiment, the data may be intercepted from the data flow of the application such that the data may no longer proceed to a storage component in the external cloud platform. The intercepted data may reenter the original process flow of the application after the intercepted data has been processed according to exemplary embodiments disclosed in the present application. In another exemplary embodiment, the data may be copied from the data flow of the application such that the data may continue to proceed to a storage component in the external cloud platform. The processing disclosed in the present application may be performed on the copied data.

In another exemplary embodiment, the application may include an external application that is maintained in an external cloud computing platform and generated by using a content management platform. The external cloud computing platform may include a third-party cloud computing platform such as, for example, an AMAZON Web Services (AWS) cloud computing platform, a GOOGLE Cloud platform, and a MICROSOFT AZURE cloud computing platform that provides on-demand computer system resources via a network such as, for example, the internet. In another exemplary embodiment, the content management platform may include computer software such as, for example, an ADOBE Experience Manager (AEM) that is used to manage the creation and modification of digital content.

In another exemplary embodiment, the application may include at least one from among a monolithic application and a microservice application. The monolithic application may describe a single-tiered software application where user interface code and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing. In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography performs corresponding actions independently and does not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S404, a data set from the captured data may be identified based on predetermined criteria. In an exemplary embodiment, the data set may include a log usage form that corresponds to a user. The log usage form may include at least one from among download information corresponding to an amount of users who have downloaded a digital asset from the external cloud computing platform, and administrative information corresponding to the user and the at least one application. For example, the administrative information may include sensitive user data such as, for example, a username and a corresponding password.

In an exemplary embodiment, the predetermined criteria may include a type of information comprising the data set. The type of information may include user specific information, digital asset specific information, and application specific information. As will be appreciated by a person of ordinary skill in the art, the data set may include at least one from among alphabetical characters, numerical characters, and symbolic characters in a collection of related sets of information that is composed of separate elements but can be manipulated as a unit by a computer.

At step S406, the identified data set may be extracted from the captured data. The identified data set may be removed from the captured data such that the identified data set can no longer be stored in the external cloud computing platform. The identified data set may only be stored in one location after the identified data set has been removed from the captured data. In another exemplary embodiment, the identified data set may be copied, and the entire captured data may proceed to storage components in the external cloud computing platform. The identified data set may be stored in two or more locations after the identified data set has been copied from the captured data.

At step S408, a connection between the external cloud computing platform and an internal cloud computing platform may be authenticated. In an exemplary embodiment, the internal cloud computing platform may include a private cloud computing platform operated by a single entity for use by the single entity. The internal cloud computing platform may communicate with and transfer data between the internal cloud computing platform, other internal cloud computing platforms, and third-party external cloud computing platforms. In another exemplary embodiment, the internal cloud computing platform may utilize computing architectures similar to external cloud computing platforms. However, the internal cloud computing platform may not provide services such as, for example, data processing and data storage services for third-party entities. In another exemplary embodiment, the internal cloud computing platform may utilize proprietary computing architectures developed by the operating entity.

In another exemplary embodiment, the connection may be authenticated by using a protocol that includes a lightweight directory access protocol (LDAP). The LDAP may be utilized to access and maintain distributed directory information services over an internet protocol (IP) network. In another exemplary embodiment, the directory information services enable the sharing of information about users, systems, networks, services, and applications throughout the network. The directory information services may provide an organized set of records in a hierarchical structure such as, for example, a username and passwords directory.

In another exemplary embodiment, the connection may be authenticated via credentials such as, for example, a username and a password combination to ensure that the connection is secure. The LDAP may operate over connection-oriented transfer services such as, for example, a transmission control protocol (TCP) connection and an internet protocol (IP) connection. In another exemplary embodiment, once the connection has been adequately authenticated, the internal cloud computing platform may utilize uniform resource locator (URL) access permission preauthorization to bypass the authentication step. For example, by granting preauthorized access permission to the URL from the external cloud computing platform, the internal cloud computing platform tags the connection as coming from a trusted source. In another exemplary embodiment, the access permission preauthorization of a specific URL from the external cloud computing platform may include a predetermined termination time such as, for example, a day and/or a week after which reauthentication of the connection may be required.

In another exemplary embodiment, the connection may include a web service relating to a representational state transfer (REST). The REST may include a software architectural style that defines a set of constraints to be used for creating web services. In another exemplary embodiment, the representational state transfer may include an architectural style usable to implement an application programing interface (API). Web services that conform to the REST architectural style may provide interoperability between computer systems on a connected network such as, for example, the internet. The REST web services allow a requesting system to access and manipulate textual representations of web resources by using a uniform and predefined set of stateless operations.

At step S410, the extracted data set may be published via a network interface to the internal cloud computing platform by using the authenticated connection. In an exemplary embodiment, the data structure that maintains a plurality of published messages may include a publish-and-subscribe model and a point-to-point model. In a publish-and-subscribe model, messages may be published to a particular message topic. Subscribers may register interest in receiving messages published on a particular message topic. In this model, neither the publisher nor the subscriber knows about each other. In a point-to-point model, messages may be routed to individual consumers that maintain queues of incoming messages. Each message may be addressed to a specific queue and the receiving client may extract messages from the queues established to hold the client's messages. Accordingly, each message may be consumed by one consumer. As will be appreciated by a person of ordinary skill in the art, the extracted data set may be published and transmitted via the authenticated connection by using any data transmission standard disclosed in the present application.

Then, at step S412, the published data set may be stored in a database on the internal cloud computing platform. The published data set may be stored in any organized collection of data that may be electronically accessed from a computer system. In an exemplary embodiment, the published data set may be directed to a predetermined data storage system on the internal cloud computing platform based on the type of data comprising the published data set. As will be appreciated by a person of ordinary skill in the art, the published data set may be stored in any data structure such as, for example, a relational data structure and a distributed non-relational data structure on the internal cloud computing platform.

Figure 5:
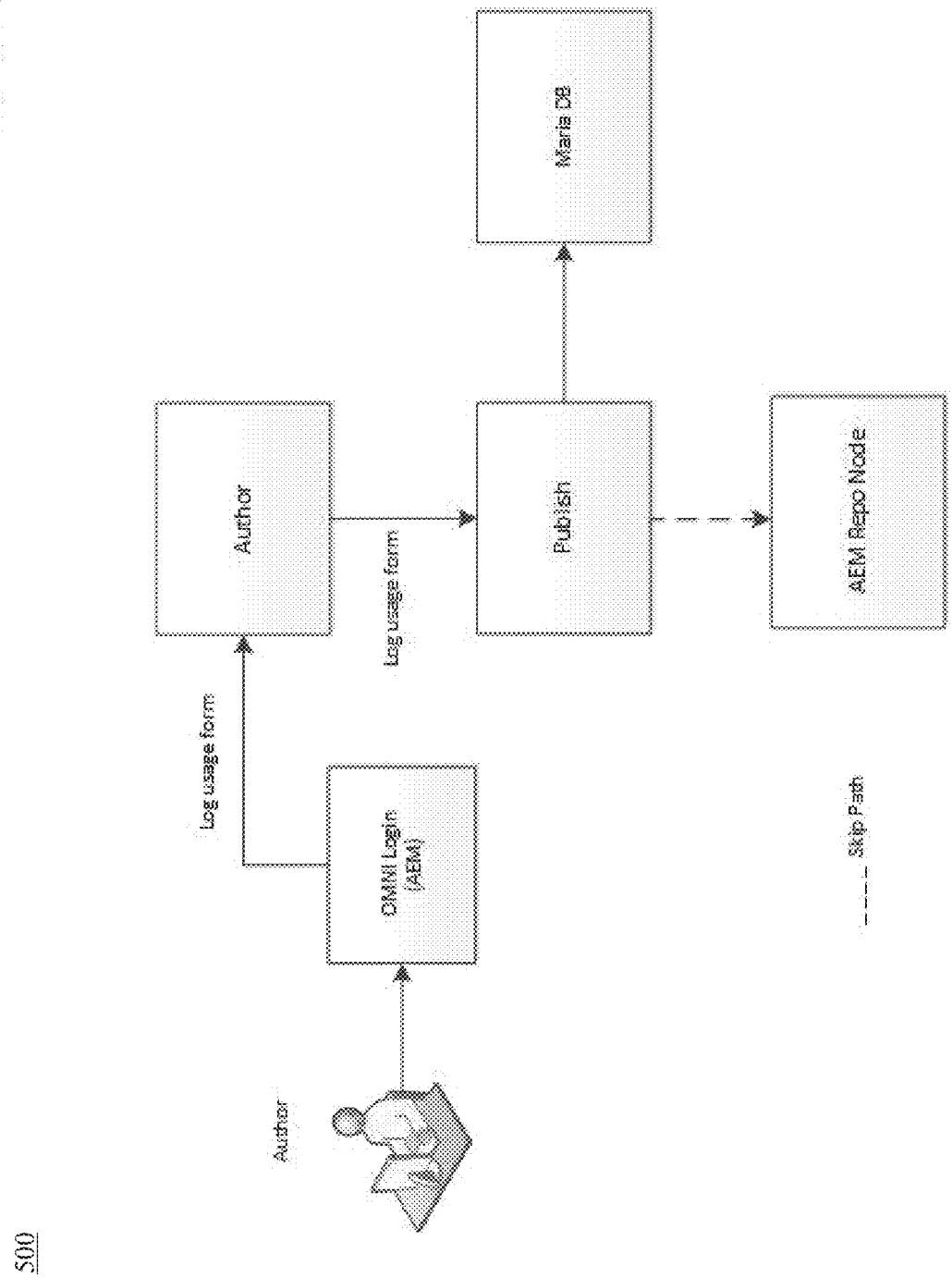
FIG. 5 is a diagram that illustrates a process flow usable for implementing a method for automatically capturing application data from an external cloud computing platform and redirecting the captured data to an internal cloud computing platform for storage, according to an exemplary embodiment.

FIG. 5 is a diagram that illustrates a process flow 500 usable for implementing a method for automatically capturing application data from an external cloud computing platform such as, for example, an AMAZON Web Services (AWS) cloud platform and redirecting the captured data to an internal cloud computing platform for storage, according to an exemplary embodiment. The process flow 500 may provide for a data capture and data redirect mechanism that is integrated into the external cloud computing platform.

As illustrated in FIG. 5, the process flow 500 begins with an author utilizing an application such as, for example, an OMNICHANNEL application that is created by an ADOBE Experience Manager (AEM). The author may use predetermined credentials to log in to the application. In turn, the application generates a log usage form corresponding to the author that tracks and records the activities of the author within the application. The log usage form may also track and record digital assets accessed by the author and whether or not the author has manipulated data within the digital assets. The log usage form may then be captured by using any embodied mechanism described in the present application. The skip path shows that the log usage form is stored in an AEM repository node when the log usage form is not captured by the system in the process flow.

After the log usage form has been captured, the process flow moves to a publishing mechanism that prepares the log usage form for transmission. The publishing mechanism may establish a connection with the internal cloud computing platform. Along with the establishment of the connection, the publishing mechanism may also authenticate the connection to ensure that the connection is secure. Then, the publishing mechanism transmits the log usage form to an internal database such as, for example, a MARIA database. The internal database may include distributed storage components of the internal cloud computing platform.

Figure 6:
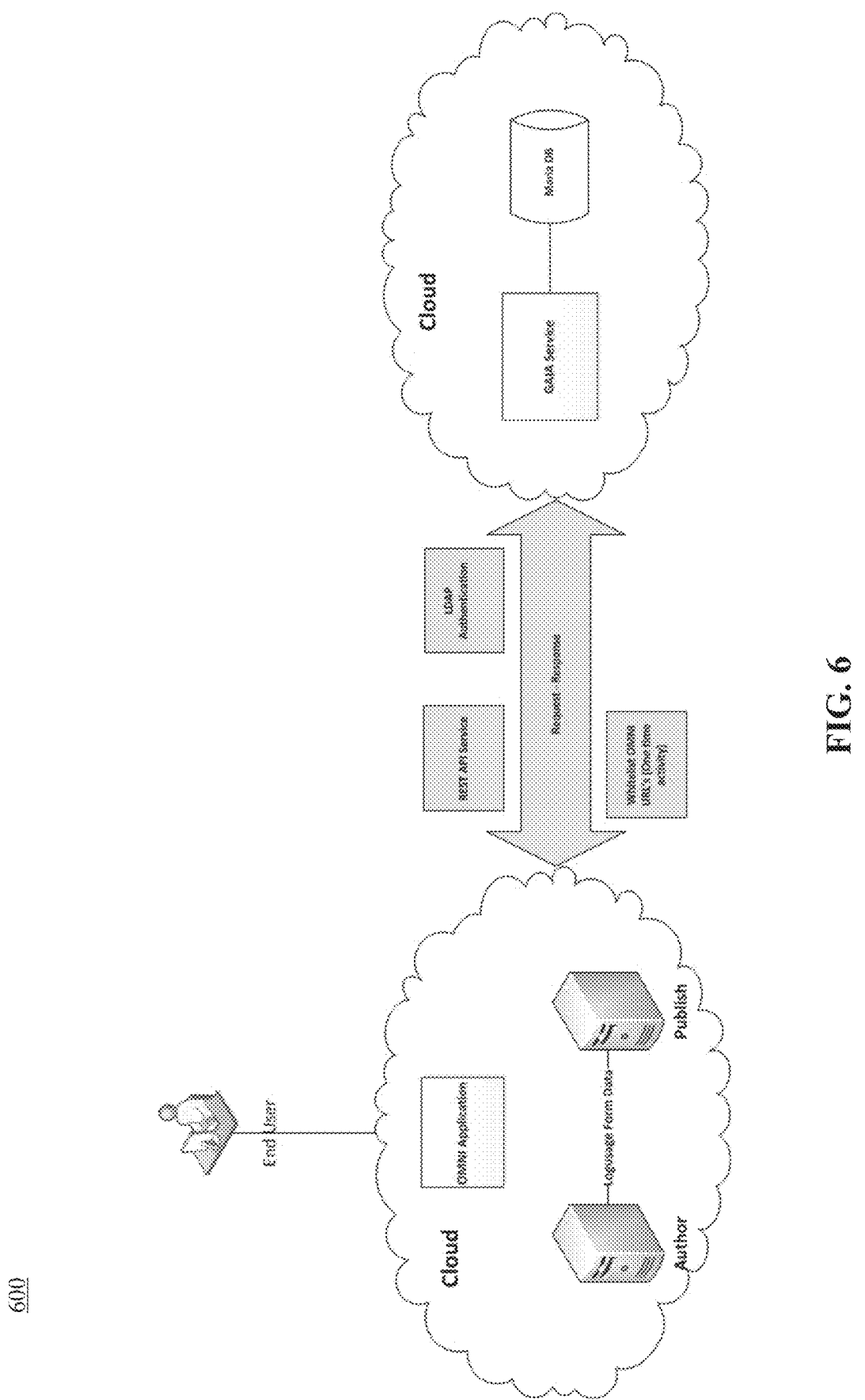
FIG. 6 is a diagram that illustrates a network interface usable for implementing a method for automatically capturing application data from an external cloud computing platform and redirecting the captured data to an internal cloud computing platform for storage, according to an exemplary embodiment.

FIG. 6 is a diagram that illustrates a network interface 600 usable for implementing a method for automatically capturing application data from an external cloud computing platform and redirecting the captured data to an internal cloud computing platform for storage, according to an exemplary embodiment. The diagram outlines the connection that is established between the external cloud computing platform and the internal cloud computing platform.

As illustrated in FIG. 6, the application provides services for an end user via the external cloud computing platform. Within the external cloud computing platform, components such as, for example, the author and the publisher interact to generate log usage form data corresponding to the end user. The publishing component may then establish a connection with the internal cloud computing platform, which includes internal database components.

The connection may operate as a request and response communication technique that utilizes publishing and consuming of messages. The connection may operate based on a software architectural style such as, for example, a representational state transfer (REST) that defines a set of constraints to be used for creating web services via an application programing interface (API). The connection may utilize a client-server protocol such as, for example, a lightweight directory access protocol (LDAP) to access directory services.

By using the LDAP, the connection may be authenticated via credentials such as, for example, a username and a password combination to ensure that the connection is secure. The LDAP may operate over connection-oriented transfer services such as, for example, a transmission control protocol (TCP) connection and an internet protocol (IP) connection. Additionally, once the connection has been adequately authenticated, the internal cloud computing platform may utilize uniform resource locator (URL) access permission preauthorization to bypass the authentication step. By granting preauthorized access permission to the URL from the external cloud computing platform, the internal cloud computing platform tags the connection as coming from a trusted source. The access permission preauthorization of the URL may include a termination time such as, for example, a day and/or a week after which reauthentication of the connection would be required.

Figure 7:
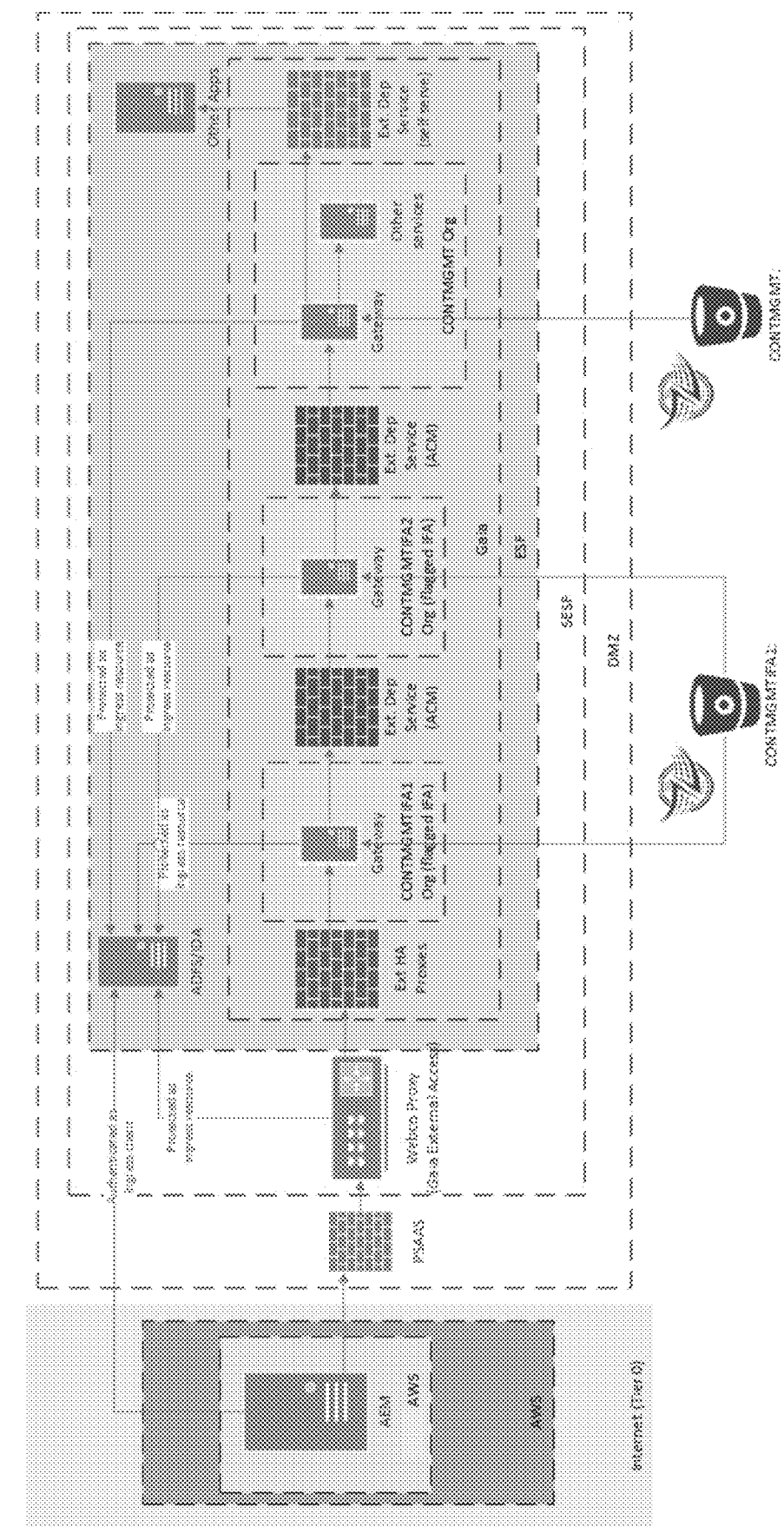
FIG. 7 is an exemplary diagram of a system that is usable for implementing a method for automatically capturing application data from an external cloud computing platform and redirecting the captured data to an internal cloud computing platform for storage.

FIG. 7 is an exemplary diagram of a system 700 that is usable for implementing a method for automatically capturing application data from an external cloud computing platform and redirecting the captured data to an internal cloud computing platform for storage. The diagram shows operating environments of the external cloud computing platform and the internal cloud computing platform as well as the system facilitating a connection between the two platforms.

As illustrated in FIG. 7, the application titled "AEM" operates within the external cloud computing platform titled "ADOBE AWS" on an internet tier. The application may be authenticated as an ingress client via an active directory federation services (ADFS) component providing single sign-on access to internal enterprise networks. An intelligence driven authentication (IDA) technique may also be utilized to authenticate the application. After authentication, data from the external cloud computing platform may be transmitted to the internal cloud computing platform.

Data transmitted from the external cloud computing platform may pass through a physical security as a service (PSaaS) layer. The data may then pass through an external access proxy such as, for example, a Webco Proxy. The external access proxy may be protected as an ingress resource and serve as an additional connection with the ADFS component. The data may also pass through external high availability (HA) proxies for load balancing of the internal cloud computing platform. After load balancing, the data may be distributed to gateways which are protected as an ingress resource. As illustrated in FIG. 7, the gateways may correspond to a container such as, for example, containers titled "CONTMGMTIFA1" and "CONTMGMTIFA2" which may be connected via external dep services to a container management organizer titled "CONTMGMT Org." The gateway for the container management organizer may also be protected as an ingress resource and provides connections to other services and other applications within the internal cloud computing platform.

Accordingly, with this technology, an optimized process for automatically capturing application data from an external cloud computing platform and redirecting the captured data to an internal cloud computing platform for storage is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for capturing data from an external cloud computing platform, the method implemented by at least one processor, the method comprising:
   capturing, by the at least one processor, data from at least one application by,
      intercepting, by the at least one processor, the data from a data flow of the at least one application,
      wherein the at least one application is maintained in a third-party cloud computing platform that provides on-demand computer system resources via a network;
   identifying, by the at least one processor, at least one data set from the data based on at least one predetermined criterion, the at least one data set including a log usage form corresponding to a user,
      wherein each of the at least one predetermined criterion includes a type of information that is in the at least one data set; and
      wherein the type of information includes user information, digital asset information, and application information;
   extracting, by the at least one processor, the identified at least one data set from the data;
   authenticating, by the at least one processor, a connection between the external cloud computing platform and an internal cloud computing platform;
   publishing, by the at least one processor via a network interface, the extracted at least one data set to the internal cloud computing platform by using the authenticated connection; and
   storing, by the at least one processor, the published at least one data set in a database on the internal cloud computing platform.

2. The method of claim 1, wherein the at least one application includes an external application that is maintained in the external cloud computing platform and generated by using a content management platform.

3. The method of claim 1, wherein the at least one application includes at least one from among a monolithic application and a microservice application.

4. The method of claim 1, wherein the log usage form includes at least one from among download information corresponding to an amount of users who have downloaded a digital asset from the external cloud computing platform, and administrative information corresponding to the user and the at least one application.

5. The method of claim 1, wherein the connection is authenticated by using a protocol that includes a lightweight directory access protocol.

6. The method of claim 5, wherein the connection is tagged based on a result of the authentication, a tag including an indication that the connection is from a trusted source and preauthorized permission to bypass additional authentication.

7. The method of claim 6, wherein the preauthorized permission includes at least one reauthentication requirement, the at least one reauthentication requirement including a predetermined period of time after which reauthentication of the connection is required.

8. The method of claim 1, wherein the connection includes at least one web service relating to a representational state transfer, the representational state transfer including an architectural style usable to implement an application programing interface.

9. The method of claim 1, wherein the capturing of the data from the at least one application includes removing the data from the corresponding data flow and preventing storage of the data in the external cloud computing platform.

10. The method of claim 1, wherein the capturing of the data from the at least one application includes copying the data from the corresponding data flow and permitting storage of the data in the external cloud computing platform.

11. A computing device configured to implement an execution of a method for capturing data from an external cloud computing platform, the computing device comprising:
a processor;
a memory; and
a communication interface coupled to each of the processor and the memory,
wherein the processor is configured to:
capture data from at least one application by further causing the processor to:
intercept the data from a data flow of the at least one application,
wherein the at least one application is maintained in a third-party cloud computing platform that provides on-demand computer system resources via a network;
identify at least one data set from the data based on at least one predetermined criterion, the at least one data set including a log usage form corresponding to a user,
wherein each of the at least one predetermined criterion includes a type of information that is in the at least one data set; and
wherein the type of information includes user information, digital asset information, and application information;
extract the identified at least one data set from the data;
authenticate a connection between the external cloud computing platform and an internal cloud computing platform;
publish, via a network interface, the extracted at least one data set to the internal cloud computing platform by using the authenticated connection; and
store the published at least one data set in a database on the internal cloud computing platform.

12. The computing device of claim 11, wherein the at least one application includes an external application that is maintained in the external cloud computing platform and generated by using a content management platform.

13. The computing device of claim 11, wherein the at least one application includes at least one from among a monolithic application and a microservice application.

14. The computing device of claim 11, wherein the log usage form includes at least one from among download information corresponding to an amount of users who have downloaded a digital asset from the external cloud computing platform, and administrative information corresponding to the user and the at least one application.

15. The computing device of claim 11, wherein the processor is further configured to authenticate the connection by using a protocol that includes a lightweight directory access protocol.

16. The computing device of claim 15, wherein the processor is further configured to tag the connection based on a result of the authentication, a tag including an indication that the connection is from a trusted source and preauthorized permission to bypass additional authentication.

17. The computing device of claim 16, wherein the preauthorized permission includes at least one reauthentication requirement, the at least one reauthentication requirement including a predetermined period of time after which reauthentication of the connection is required.

18. The computing device of claim 11, wherein the connection includes at least one web service relating to a representational state transfer, the representational state transfer including an architectural style usable to implement an application programing interface.

19. The computing device of claim 11, wherein the capturing of the data from the at least one application includes removing the data from the corresponding data flow and preventing storage of the data in the external cloud computing platform.

20. The computing device of claim 11, wherein the capturing of the data from the at least one application includes copying the data from the corresponding data flow and permitting storage of the data in the external cloud computing platform.

* * * * *